May 1, 1962     T. STREUBEL     3,032,296

GRAVITY ACTUATED AIRPLANE CONTROL

Filed Jan. 26, 1959     2 Sheets-Sheet 1

INVENTOR.
Theodore Streubel
BY
McGrew & Edwards
ATTORNEYS

May 1, 1962 — T. STREUBEL — 3,032,296
GRAVITY ACTUATED AIRPLANE CONTROL
Filed Jan. 26, 1959 — 2 Sheets-Sheet 2
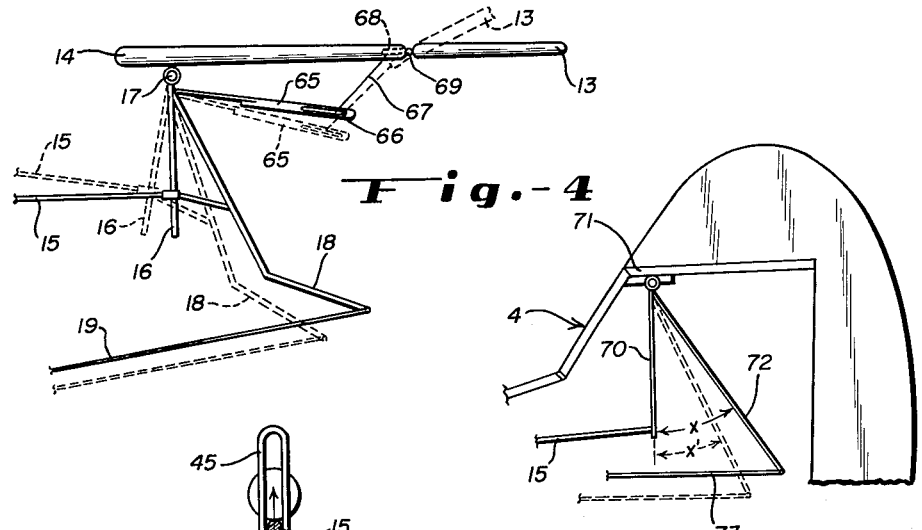
Fig.-4
Fig.-5
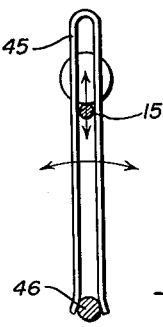
Fig.-6
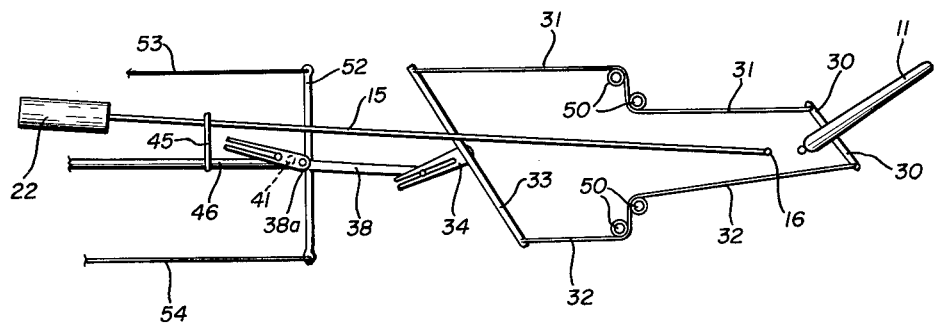
Fig.-7
INVENTOR.
Theodore Streubel
BY
McGrew and Edwards
ATTORNEYS

United States Patent Office 3,032,296
Patented May 1, 1962

3,032,296
GRAVITY ACTUATED AIRPLANE CONTROL
Theodore Streubel, Rte. 3, Box 308,
Colorado Springs, Colo.
Filed Jan. 26, 1959, Ser. No. 788,859
4 Claims. (Cl. 244—80)

This invention relates to aircraft controls and more particularly to a gravity actuated system for moving the control surfaces of the aircraft and controlling the flight attitudes thereof.

Included among the objects and advantages of the present invention is a gravity actuated, simplified control for maintaining stability of an aircraft in flight.

Another object of the invention is to provide a simplified, gravity actuated control for automatically maintaining coordinated flight of an aircraft.

A further object of the invention is to provide a simplified, highly sensitive control for automatically maintaining coordination between pitch, roll and yaw of an airplane in flight.

A further object of the invention is to provide a simplified control which is adaptable to various types of airplanes with minimum conversion, and which is readily changed in size to be accommodated in a particular aircraft.

A still further object of the invention is to provide an inexpensive, simplified and highly sensitive automatic flight control system for model airplanes which permits take-offs, coordinated flight and landings.

These and other objects and advantages of the invention may be readily ascertained by referring to the following description and appended illustrations in which:

FIG. 4 is a detailed side elevation of the device of the invention illustrating an aircraft elevator control;

FIG. 5 is a side elevational view of a portion of the linkage mechanism of the control system of the invention;

FIG. 6 is a front elevational view of a pitch and roll linkage mechanism of the device of the invention; and, FIG. 7 is a top plan view of the rudder control system illustrated in an operative position.

The invention, in general, includes a main, gravity actuated, sensing and control element which is a cantilever beam extending normally from an upright suspended support element. The suspended element is hinged at its suspending point to permit the beam to move through an upright arc and to, also, permit it to swing through a lateral arc. The suspended element is hinged which permits it to swing. The suspended element may be pivoted to permit it to partially rotate or the beam is flexible enough to swing through a lateral arc. The control surfaces of the aircraft in which the device is installed are interconnected through various linking mechanisms to the beam or to the suspending member whereby the control surfaces may be moved in response to the movement of the beam. In one form especially designed for model airplanes, the beam is provided with a high ratio of weight to control surface area so that direct mechanical linkages may be utilized between the beam and the control surfaces. The weight and lever arm of the beam power the movement of the control surfaces by providing sufficient force for such movement. In such a form, however, normal weight of the aircraft may be essentially retained by utilizing necessary parts of the aircraft as part of the beam, for example, in a radio controlled model airplane, the radio battery may be mounted on a light weight beam to provide the necessary weight. In another form, a small beam having a very low ratio of weight to control surface area may be used to mechanically or electrically actuate servo-motors or the like which provide the actual power for the movement of the control surfaces.

For simplicity, the following description is used to illustrate the invention in connection with model airplanes of conventional design, e.g., a conventional engine driven propeller, high wing and empennage. The control system of the invention may be readily adapted to large or full size airplanes, unconventionally designed airplanes and the like. For example, the system controlling conventional elevators and ailerons may be readily changed to control ailerons which are used in tailless type aircraft. It is not intended that the description limits the invention of the appended claims to the precise details set forth and illustrated in the appended drawings.

Figure 1:
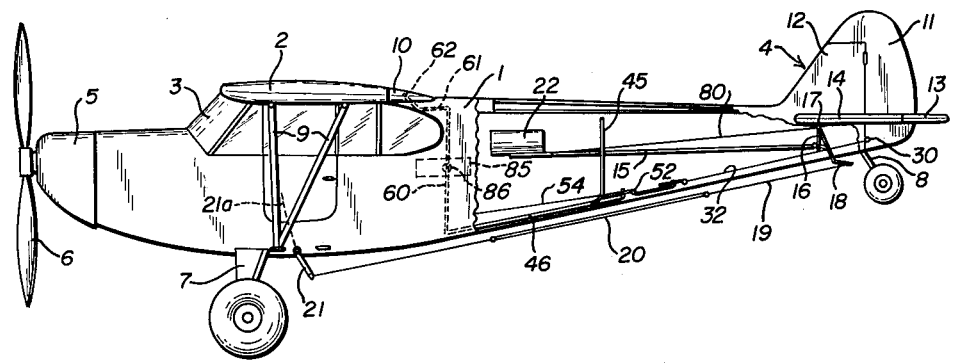
FIG. 1 is a partially cut-away side elevational view of an aircraft utilizing a control system according to the invention.

FIG. 1 depicts a more or less conventional type high-wing monoplane which includes a fuselage 1 having a high-wing 2 mounted thereon above the cockpit or pilot's compartment 3. An empennage section 4 is secured to the rear of the fuselage 1 and an engine, not completely shown, 5 is secured to the opposite end of the fuselage. A propeller 6 is secured in the normal manner to the engine 5. Main gear 7 is secured in conventional manner to the fuselage, and the tail wheel 8 is likewise secured in conventional manner to empennage portion of the fuselage. Wing struts 9 secured between the fuselage and the outer portion of the wing provide bracing for the aircraft in conventional manner. The control surfaces for this particular type of aircraft include conventional ailerons 10, a rudder 11 secured to a vertical stabilizer 12 in conventional manner, and elevators 13 secured to horizontal stabilizers 14, likewise, in conventional manner.

The automatic control system of the invention includes an elongated, cantilever beam 15 secured to and depending normally from an upright suspended beam 16 universally pivoted at its upper end 17 to a mounting near the tail of the fuselage. An arm 18 is secured to the element 16 rearwardly therefrom and a line 19 having a center mounted spring 20 is secured to an anchor bar 21 to counteract the weight of the beam 15 and generally hold it level when the aircraft is in normal flying. The tension of the spring is utilized to vary flight characteristics as explained below i.e., the spring tension force is variable.

In the device selected for illustration, the beam is light weight and a flashlight battery 22 is mounted on it to provide weight for actuating the control surfaces. By suitable flexible and slacked connections to the battery, the connections not being shown, power for the operation of the radio of the aircraft is provided without hindering action of the beam.

The beam 15 is interconnected through a series of mechanisms to the aircraft control surfaces, and movement of the beam moves the control surfaces. For the device shown, the normal action is to counter aircraft movement due to air currents tending to disrupt coordinated flight of aircraft through the air on a predetermined course. The device insures coordinated flight of radio controlled aircraft giving positive control at all times.

Figure 2:
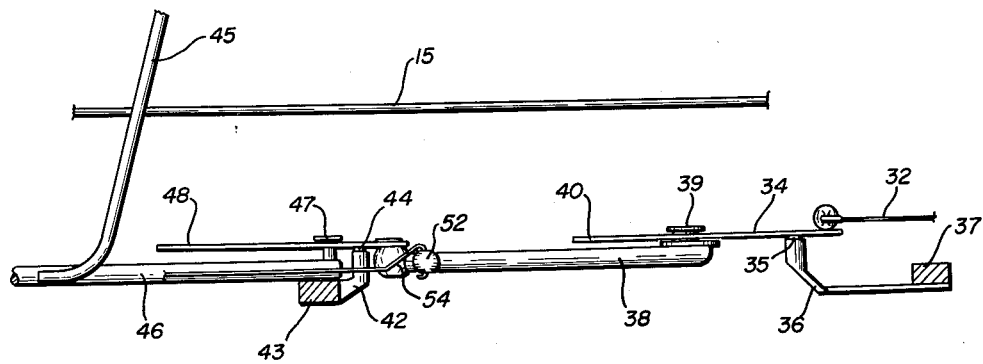
FIG. 2 is a side elevational, enlarged detail portion of an aircraft rudder control system utilizing the device of the invention.
Figure 3:
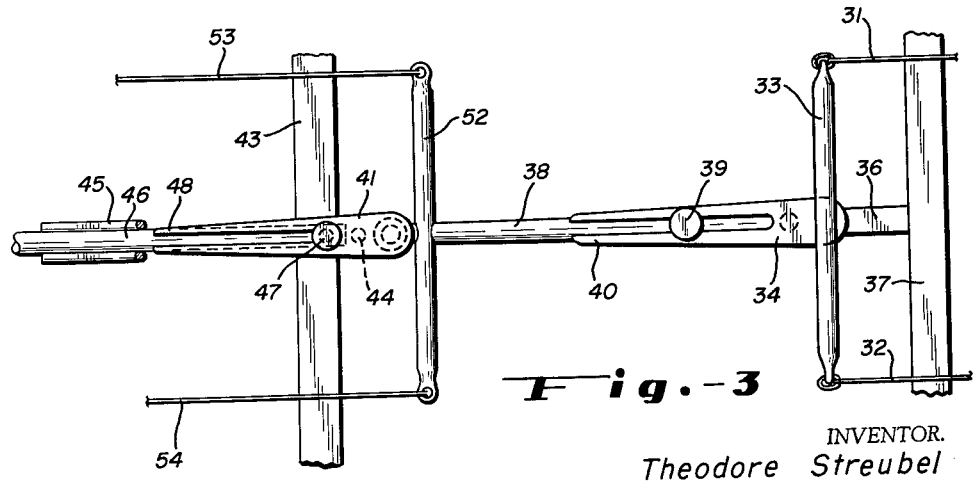
FIG. 3 is a top plan view of the rudder control system of FIG. 2.

The rudder control illustrated in FIGS. 2 and 3 shows the provision for the automatic flight control and combined automatic and manual flight control. The rudder 11 has a control bar 30 secured at the lower end thereof and arranged to turn the rudder on its hinges. Control wires 31 and 32 are connected to the control bar 30.

Both of the wires 31 are connected to a bar 33 which is fixedly mounted on a pivot plate 34. The pivot plate 34 is mounted on a pivot 35, and pivoting of the pivot plate 34 swings the bar 33 to simultaneously pull one wire and push the other and thereby move the rudder. The pivot 35 is supported on arm 36 which is secured to a frame member 37 of the aircraft. The pivot plate 34 is swung about the pivot by means of a link arm 38 which has a headed pin 39 securely mounted thereon in position to be loosely accommodated between bifurcated end 40 of the plate 34. The headed connector slips freely in the bufurcated end since there must be relative movement between the member 38 and the pivot bar 34. The linking arm 38 is pivotally secured to another pivot plate 41 which is pivotally mounted on a pivot mount 42 which is secured to a frame member 43 of the aircraft. A pivot 44 permits the pivot plate 41 to rotate thereabout and swinging of the pivot plate swings the connecting bar 33. The pivot plate 41 is moved by a connection bar 46 secured to an upright yoke 45 which straddles the cantilever beam 15. Lateral movement of the beam moves the yoke 45 and connecting bar 46 laterally.

The general configuration of the yoke 45 is illustrated in FIG. 6, where the beam 15 is illustrated in position in the yoke, and showing it arranged to freely move up and down in the yoke. Lateral movement of the beam relative to the yoke is restricted and as the beam moves sideways the yoke is carried along. The yoke 45 is securely mounted on the connecting bar 46 which is pivotally secured at one end and has a headed connecting pin 47 secured to the other end thereof. The pin is loosely mounted in bifurcated end 48 of the pivot plate 41.

Movement of the rudder by means of the cantilever beam 15 is illustrated in FIG. 7 where movement of the beam 15 to the right (since this is a top plan view) moves the yoke 45 to the right simultaneously swinging the connecting bar 46 to the right and turning the pivot plate 41. When the bifurcated end of the plate 41 is pulled to the right, the connecting link 38 is moved to the left turning the pivot plate 34 to the left and swinging the bridle 33 to the right pulling the wire 31 and pushing the wire 32. The wires may be wound around pulleys 50 to align the wires with the rudder 11. If the beam 15 moves to the left, an opposite result occurs and the rudder is moved to the left or toward the bottom of the page. In this manner if the plane drifts uncoordinated in either direction, the cantilever beam 15 swings to the windward side, and through the linking mechanism swings the rudder in that direction tending to coordinate the controls or to correct for the amount of drift.

A rudder bridle 52 is secured to the linking arm 38 substantially normal thereto, and rudder cables 53 and 54 are interconnected between the rudder controls in the pilot's compartment of the airplane and the rudder bridle 52. Rolling or yawing due to gusts of uncoordinated flight permits the beam to move rod 38 sideways and rudder bridle 52 holds the connecting rod 38 substantially parallel to the axis of the fuselage. The pivot plate 41 swings to one side swinging the plate 34 to the opposite by the lateral movement of rod 38. This permits the rudder 11 to be moved by means of the rudder bridle 33. The aricraft may be controlled, however, in the normal manner by depressing one of the rudder pedals which turns the rudder bridle 52, pivoting the linking arm 38 about pivot 38a, pivoting the plate 34 and its attached rudder bridle 33. This rudder control is thus independent of the automatic control and controls the rudder in the conventional manner.

Since the beam 15 is cantilevered from its suspending arm, it is free to swing through an upright direction and in a lateral direction. If the aircraft is coordinated, the aircraft may be turned in a coordinated manner maintaining the beam 15 in centered position, the turn providing centrifugal force to move the beam laterally outward, thus providing banking force to the ailerons to provide proper bank at which time the beam will again be centered. If a side slip in either direction occurs, the beam will immediately move in the opposite direction of the force moving the yoke 45 and subsequently the rudder 11 causing the airplane to go back to the coordinated flight. Thus any tendency to roll or slip is counteracted by the movement of the beam 15 due to such movement.

The beam 15 is mounted on the hinged upright rod 16 which is maintained in its relative position normal to the line of flight of the aircraft, this position generally coincides with the plane of the vertical stabilizer. If the plane is rolled slightly, for example one or two degrees, the axis of rotation of the plane is tilted and the beam 15 tends to swing to the downward side due to the angle of the support 16. This swing would be at least 90 degrees if the support 16 remained at the tilt and if the beam were free to swing to the low point of the rotation. This tendency to swing to the low point of a circle around the axis provides a substantial drive or power for moving the control surfaces. The moment of the weight and arm is a substantial force, far in excess of the force needed to move the control surfaces. This tendency to swing to the low point occurs through a major portion of aircraft roll from straight and level to near vertical bank. Thus any tendency of the aircraft to roll is srongly counteracted by the tendency of the beam to move to the low point of rotation. In the smaller model of airplanes, the weight of the beam is sufficient to provide a very large force for very small angles of roll. This force produced for even small angles of bank provides a device which is highly sensitive to roll and slipping movements and accurate control and almost instantaneous correction is achieved.

The tendency of the beam 15 to move on aircraft side slip or uncoordinated movement as by gusty wind tends to control and counteract drift. As is well known, the wind does not produce a constant unidirectional force along a given course, and as the force of the wind varies on the passage of an airplane passing through it, it is subjected to the forces which tend to cause side slipping of the plane. The lateral forces generally affect the tail more strongly than the front of the airplane due to the surfaces of the vertical stabilizer and rudder. As the gusts of wind impinge on the airplane and the tail, there is a tendency to side slip and yaw. These uncoordinated movements move the beam relative to the fuselage, moving the control surfaces to counteract the gusts and drift caused by the side impinging wind and gusts.

The roll control is, also, aided by means of the ailerons being moved by movement of the rod 15. For this purpose the lower end of rod 46 is secured to an upright rod 60 which is pivotally secured at each end in an upright position in the fuselage. A control arm 61 extends forwardly near the top of the upright rod 60 and torque rods 62 extend from the outer end of the rod 61 to the ailerons. Rod 60 is rotatable about pin 36 extending from mounting block 85. Mounting block 85 is rigidly fixed to an adjacent part of the aircraft fuselage. The rod 46 is rigidly secured to the upright 60, as is the extending arm 61, so that movement of the rod 46 rotates the rod 60 about pin 86 and swings the rod 61 through an arc. The swing of rod 61 moves the torque rods in opposite directions, as they are attached to the rod, and moving the ailerons in conventional manner. For different types of aileron movement systems, the rod 61 may be used to actuate the particular movement system, e.g. wires and lever arms.

If the aircraft rolls or dips a wing, the beam 15 swings to the low side, moving the yoke 45 and its attached rod 46. This movement swings the rod 46 which rotates the upright 60 swinging the forward rod 61 and pushing one torque bar 62 toward one aileron and pulling on the other to move the ailerons, counteracting the roll or wing dip. The movement of the ailerons occurs simultaneously with the movement of the rudder so that the plane is rolled back to straight level flight in a coordinated movement.

Pitch control of the aircraft is provided by means of a linking arm fixedly interconnected with the upright suspended rod 16 and secured to the elevators 13, as illustrated in FIG. 4. A linking arm 65 is secured to the upright support 16, and is arranged to swing through an arc therewith. The outer end of the linking arm 65 is provided with a slot 66 in which rides a wire yoke 67 which is secured to a forward member 68 of the elevator 13. The elevator 13 pivots around hinges 69, and movement of the arm 65 in response to movement of the beam 15 moves the elevator 13 up or down.

The beam 15 controls the pitch of the aircraft by its up and down swinging movement in relation to major axis through the aircraft. For example, as illustrated in FIG. 4, if the nose of the aircraft drops, the beam 15 tends to remain in its position which is now up in relation to the fuselage, since the fuselage has tilted. In this movement in relation to the fuselage, the arm 65 is pulled down relative to the horizontal stabilizer 14 pulling the wire yoke 67 and moving the elevator 13 upwardly bringing the tail down back into normal level flight. If the nose of the airplane is moved up, a reverse action occurs and the beam 15, which tends to stay in its same position, is now down relative to the fuselage pushing the arm 65 up and pushing the elevator 13 down tending to bring the nose back down to its normal level position. The automatic pitch control provides for an automatic, smooth take-off and landing in a similar manner since in such maneuvers there is a change in velocity and the static inertia of the beam provides a similar effect on the beam.

Immediately prior to take-off, the take-off roll, the aircraft is sitting in a three-point position on the ground with the control beam in a down position. As acceleration occurs the beam tends to depress further lowering the elevators so as to raise the tail during the roll by air passage of the tail surfaces. As flying speed is approached, the rate of acceleration diminishes and the weight tends to assume its normal flying position and the aircraft gradually lifts into the air. By adjusting the tension on the spring to hold the beam at a particular position, the device becomes essentially an automatic air density control, or an altitude control so that when the aircraft reaches the particular altitude for the setting, the angle of attack of the aircraft for that altitude and speed provides the proper positioning of the beam for straight and level flight. Thus for a given setting of the control element the aircraft will climb to its predetermined pressure altitude, that is, that altitude at which the angle of attack of the aircraft causes neutralizing of the beam. The aircraft will fly at that altitude so long as its weight, throttle settings and the barometric pressure remains the same.

When it is desired to land the aircraft, the power is gradually shut off and as the power is reduced the deceleration tends to raise the weight, raising the elevators and permitting the aircraft to gradually lose altitude in a characteristic, gliding attitude. As the aircraft approaches the ground, the power is further reduced, decelerating the plane, raising the weight further and lowering the tail to a three-point position, permitting a three-point landing. A lever 21a extending to the pilot's compartment permits adjusting the sensitivity of the control and the G stress. Thus take off and landing speeds may be controlled as well as turns.

The action of this control system thus provides an automatic true bank control, which permits the aircraft to be banked and turned so long as coordinated flight is achieved. In the event there is any slipping, the beam moves in response to the slipping moving the control surfaces to provide coordinated flight. Furthermore, due to the pitch control, the device may be used on an anti-over stress control which may be installed in an aircraft to only operate above certain centrifugal forces which are predetermined, for example, four G (four times gravity) for a particular aircraft. In this case the spring tension on the rod 16 is sufficient to hold the beam immobile until approximately four G is exerted on it so that normal maneuvers may be performed in the aircraft but when a maneuver is performed imposing more than four G on the aircraft, the beam is moved actuating the elevators and relieving the force on the aircraft to the four G.

The cantilever beam reacts normally to gravity and conventional centrifugal forces so that it may operate effectively to maintain coordinated flight either through a direct linkage between the beam and the control surfaces or through actuating motors or boosters. Due to the fact that a slight angle of the rod 16 tends to permit a swing of the beam through an arc of about 90 degrees, there is a substantial force available to move the control surfaces providing a very sensitive instrument and control. The amount of this force is a resultant of the weight of the beam and its effective length. This force is effective to control the airplane at slight angles of roll and pitch due to its high sensitivity.

The modification illustrated in FIG. 5 illustrates a different mounting of the vertical hinge support rod for the beam 15. In this case a vertical rod 70 is secured to a frame member 71 adjacent the top of the vertical stabilizer 4 of the aircraft to provide a longer rod and to support the beam without additional structural modification. When the rod 70 is supported at a lower position, aircraft structural modification is generally necessary to support the weight. In the case of modified mounting, counterbalance rod 72 with the counterbalance support 73 may be placed inside the aircraft rather than on the outside as illustrated in FIG. 1. This mounting is satisfactory for large scale and passenger carrying aircraft.

FIG. 5, also, illustrates a difference in the angle at which the support beam is positioned to the vertical, and thus showing there is a change in effective lever arm as the beam 15 is moved up and down. The angle $x$ is the angle at which the counterbalance arm 72 normally rests in relation to the center beam 15 while the angle $x'$ shows a change in length of effective arm when the beam 15 moves in relation to the vertical. This effective lever arm change provides an effective difference in forces exerted by the beam so that the beam may effect a varying force on the control surfaces, which in this case would be the elevators. Thus the greater the deflection in the beam 15, the greater the force exerted on the elevators.

In model airplanes which are obviously pilotless, it is desirable to have a very sensitive control and thus a long beam of a relatively light weight is utilized. For this long beam especially where it is carrying the weight such as illustrated in FIG. 1, a support wire 80 may be utilized merely to support the small diameter elongated tube which has the battery 22 mounted thereon. Thus in a flying model of a small horsepower high wing aircraft utilizing the weight on a rod, the amount of weight required for the entire control system may be maintained at less than about 2% of the weight of the aircraft. With such a low weight, however, the forces for controlling the control surfaces are generally in excess of that necessary for the sensitive control of such an aircraft under normal flying conditions. Thus it is seen that a very minor addition of weight to an aircraft provides a highly sensitive control system which in effect is an automatic control for coordinated flight for the aircraft.

Further modifications may be apparent to those skilled in the art, and the intent of the description is not to limit the spirit and scope of the invention to the precise details set forth.

I claim:

1. An automatic flight control for an aircraft having conventional control surfaces comprising an upright member hingedly supported at its upper end adjacent the tail of the aircraft and arranged to swing in a vertical plane, a cantilever beam mounted on and normal to said upright member and arranged to swing with the upright member through a limited vertical arc and swing through a limited lateral arc normal to said vertical arc, a spring tensioned counterbalance means mounted on said upright member and arranged to support said beam in alignment with a straight and level line of flight of the aircraft, and means interconnecting said beam and support with the control surfaces of the aircraft whereby movement of said beam actuates movement of the control surfaces to maintain coordinated flight.

2. An automatic flight control according to claim 1 in which the ratio of weight of said beam to control surface area of said aircraft is sufficiently high to permit movement of the control surfaces through a direct connection.

3. An automatic flight control according to claim 1 in which the moment of the weight and length of said beam is in excess of the force required to move said control surfaces.

4. An automatic flight control for an aircraft having conventional control surfaces comprising an upright member hingedly suspended from its upper end in the aircraft and arranged to swing through a vertical arc, a cantilever beam mounted on and normal to said upright member and arranged to swing through a limited vertical arc and through a lateral arc normal thereto, variable force counter-balance means mounted on said upright member and arranged to support said beam in alignment with the line of flight of the aircraft in a straight and level flying attitude, a yoke straddling said beam and arranged to permit said beam to move through the vertical arc without movement of the yoke and to move with the beam through a lateral arc, linkage means interconnecting said yoke and the rudder of the aircraft whereby movement of said beam moves the rudder for roll control of the aircraft, said linkage means including a pair of interconnected pivot plates, one of said plates being connected to said yoke and a pilot's rudder bar, and the other plate being connected to the aircraft rudder whereby the rudder may be controlled by said beam and by the pilot's bar, and an extending member fixedly mounted on said upright member and interconnected with the elevators of the aircraft whereby vertical swinging movement of the beam moves the elevators of the aircraft for pitch control.

References Cited in the file of this patent

UNITED STATES PATENTS

| | | |
|---|---|---|
| 1,509,743 | Wegner | Sept. 23, 1924 |
| 2,238,403 | Soderquist | Apr. 15, 1941 |
| 2,454,598 | Doyle | Nov. 23, 1948 |
| 2,510,133 | Nissen | June 6, 1950 |